United States Patent
Li et al.

(10) Patent No.: US 11,624,867 B1
(45) Date of Patent: Apr. 11, 2023

(54) KEYCAP, METHOD OF MANUFACTURING THE SAME AND KEY STRUCTURE

(71) Applicant: Primax Electronics Ltd., Taipei (TW)

(72) Inventors: Che-An Li, Taipei (TW); Lei-Lung Tsai, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/956,593

(22) Filed: Sep. 29, 2022

(30) Foreign Application Priority Data

Sep. 19, 2022 (TW) .................................. 111135361

(51) Int. Cl.
   *H01H 9/18* (2006.01)
   *H01H 13/00* (2006.01)
   *F21V 8/00* (2006.01)

(52) U.S. Cl.
   CPC ......... *G02B 6/0043* (2013.01); *G02B 6/0051* (2013.01)

(58) Field of Classification Search
   CPC .................................................. H01H 13/023
   See application file for complete search history.

(56) References Cited

U.S. PATENT DOCUMENTS

| | | | |
|---|---|---|---|
| 2009/0189316 A1* | 7/2009 | Chang | B29C 35/02 264/447 |
| 2013/0162450 A1* | 6/2013 | Leong | H01H 3/125 341/20 |
| 2014/0126176 A1* | 5/2014 | Yao | G02B 6/006 362/23.03 |
| 2014/0183016 A1* | 7/2014 | Tu | H01H 13/83 200/314 |
| 2018/0053611 A1* | 2/2018 | Yang | H01H 13/7065 |
| 2020/0098532 A1* | 3/2020 | Liang | H01H 3/12 |
| 2020/0203097 A1* | 6/2020 | Ore-Yang | B29C 37/0028 |
| 2021/0280379 A1* | 9/2021 | Chen | H01H 3/125 |

* cited by examiner

*Primary Examiner* — Eric T Eide
(74) *Attorney, Agent, or Firm* — Kirton McConkie; Evan R. Witt

(57) ABSTRACT

The present disclosure provides a keycap, including: a light-guiding microstructure layer made of a first material, the light-guiding microstructure layer including a base layer and a plurality of microstructures disposed on a lower surface of the base layer; and a light-transmitting layer disposed over the light-guiding microstructure layer and in contact with the base layer, the light-transmitting layer being made of a second material different from the first material. The present disclosure further provides a method of manufacturing the above-mentioned keycap and a key structure including the above-mentioned keycap.

10 Claims, 2 Drawing Sheets

KEYCAP, METHOD OF MANUFACTURING THE SAME AND KEY STRUCTURE

FIELD OF THE INVENTION

The present disclosure relates to a keycap capable of being fully illuminated, a method for manufacturing the keycap, and a key structure including the keycap.

BACKGROUND OF THE INVENTION

An existing key structure is limited by shading of various elements beneath a keycap and an emission angle of a light source, so that a top surface of the keycap is locally illuminated, which may lead to uneven brightness of character(s), so how to improve aforementioned phenomenon has become a technical issue in the art.

SUMMARY OF THE INVENTION

The present disclosure provides a keycap, which includes a light-guiding microstructure layer and a light-transmitting layer. The light-guiding microstructure layer is made of a first material, and the light-guiding microstructure layer includes a base layer and a plurality of microstructures disposed on a lower surface of the base layer. The light-transmitting layer is disposed over the light-guiding microstructure layer and in contact with the base layer, and the light-transmitting layer is made of a second material different from the first material.

In some embodiments of the present disclosure, the light-transmitting layer is not in contact with the microstructures.

In some embodiments of the present disclosure, the light-transmitting layer has an opening extending inward from a lower surface of the light-transmitting layer, and the base layer is disposed in the opening.

In some embodiments of the present disclosure, the opening is a blind hole.

In some embodiments of the present disclosure, the lower surface of the light-transmitting layer outside the opening is substantially coplanar with the lower surface of the base layer.

In some embodiments of the present disclosure, the second material includes a light diffusing agent.

In some embodiments of the present disclosure, the keycap further includes: a primer layer, disposed over and covering the light-transmitting layer; and a topcoat layer, disposed over and covering the primer layer, in which a color of the topcoat layer is different from a color of the primer layer, and the topcoat layer has at least one through opening exposing a portion of the primer layer.

The present disclosure also provides a key structure, which includes the aforementioned keycap, a circuit board and at least one light source. The circuit board is disposed beneath the keycap. The at least one light source is disposed over the circuit board and between the circuit board and the keycap, and the light source is configured to provide light projected to the light-guiding microstructure layer.

The present disclosure further provides a method of manufacturing a keycap, which includes: sequentially performing a first injection molding process and a second injection molding process to form a light-transmitting layer and a light-guiding microstructure layer, respectively, or to form a light-guiding microstructure layer and a light-transmitting layer, respectively, in which the light-guiding microstructure layer includes a base layer and a plurality of microstructures disposed on a lower surface of the base layer, and the light-transmitting layer is disposed on the light-guiding microstructure layer and in contact with the base layer.

In some embodiments of the present disclosure, the light-guiding microstructure layer is made of a first material, and the light-transmitting layer is made of a second material different from the first material.

BRIEF DESCRIPTION OF THE DRAWINGS

Aspects of the present disclosure are best understood from the following embodiments, read in conjunction with the accompanying drawings. It should be understood, however, that in accordance with common practice in the industry, various features have not necessarily been drawn to scale. Indeed, shapes of the various features may be suitably adjusted for clarity, and dimensions of the various features may be arbitrarily increased or decreased.

DETAIL DESCRIPTION OF THE PREFERRED EMBODIMENT

Figure 1:
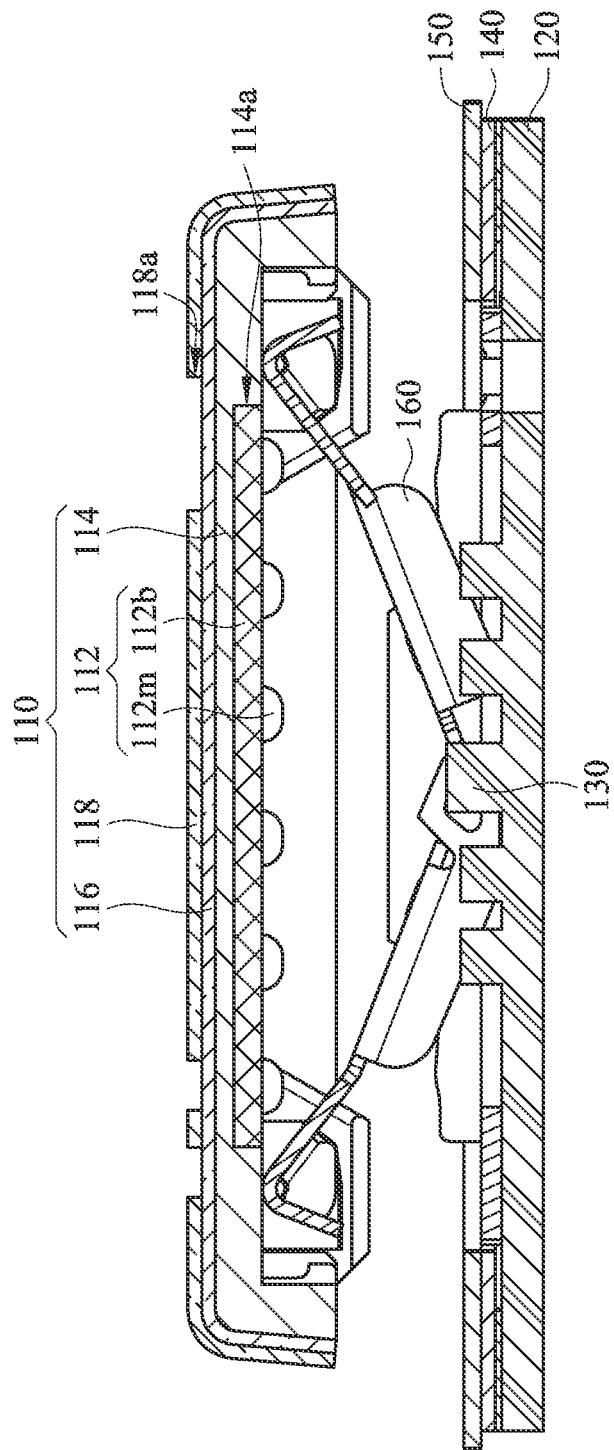
FIG. 1 is a schematic cross-sectional view of a key structure according to an embodiment of the present disclosure.

The advantages and features of the present disclosure and the method for achieving the same will be described in more detail with reference to exemplary embodiments and the accompanying drawings to make it easier to understand. However, the present disclosure can be implemented in different forms and should not be construed as being limited to the embodiments set forth herein. On the contrary, for those skilled in the art, the provided embodiments will make this disclosure more thorough, comprehensive and complete to convey the scope of the present disclosure.

The spatially relative terms in the text, such as "beneath" and "over", are used to facilitate the description of the relative relationship between one element or feature and another element or feature in the drawings. The true meaning of the spatially relative terms includes other orientations. For example, when the drawing is flipped up and down by 180 degrees, the relationship between the one element and the other element may change from "beneath" to "over." In addition, the spatially relative descriptions used herein should be interpreted the same.

As described in the related art, the existing key structure is limited by the shading of the various elements beneath the keycap and the emission angle of the light source, so that the top surface of the keycap is locally illuminated, which may lead to the uneven brightness of the character(s). Accordingly, the present disclosure provides a keycap, and a light exiting surface of a light-transmitting layer of the keycap can be fully illuminated, so that illumination of full character(s) can be realized. Various embodiments of the keycap of the present disclosure are detailed below.

Figure 2:
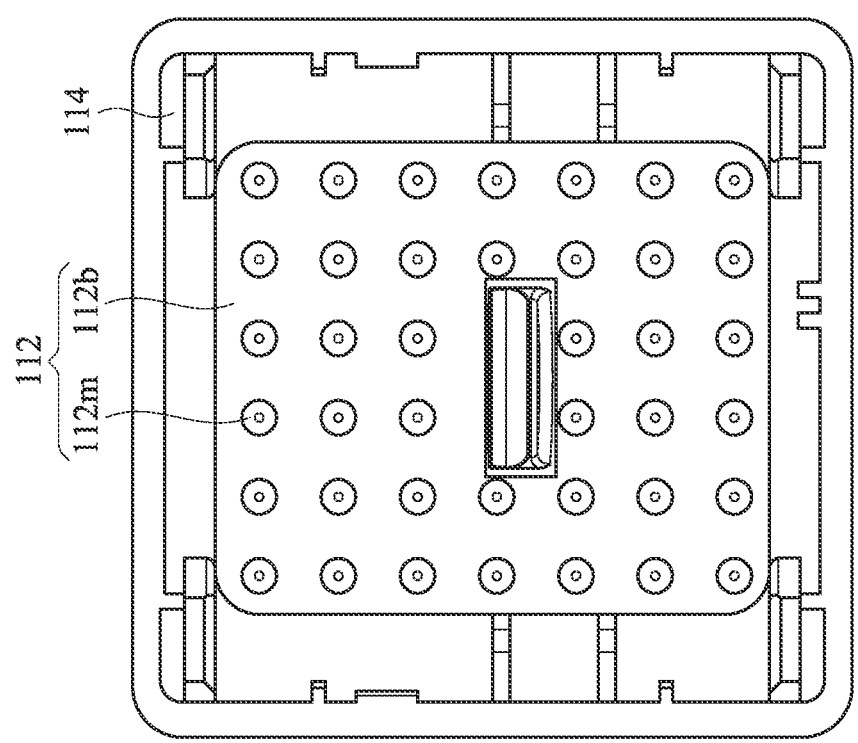
FIG. 2 is a schematic bottom view of the keycap of FIG. 1.

FIG. 1 is a schematic cross-sectional view of a key structure according to an embodiment of the present disclosure. FIG. 2 is a schematic bottom view of the keycap of FIG. 1. As shown in FIGS. 1 and 2, the keycap 110 includes a light-guiding microstructure layer 112 and a light-transmitting layer 114.

The light-guiding microstructure layer 112 is made of a first material. In some embodiments, the first material is an optical grade material with a high refractive index. In some embodiments, the first material is polymethyl methacrylate (PMMA), polycarbonate (PC), or other suitable materials. In some embodiments, the first material does not include a light diffusing agent (e.g., light diffusing powder, such as titanium dioxide powder).

The light-guiding microstructure layer 112 includes a base layer 112b and a plurality of microstructures 112m, and the microstructures 112m are disposed on a lower surface of the base layer 112b. In some embodiments, the base layer 112b and the microstructures 112m are integrally formed.

The light-transmitting layer 114 is disposed on the light-guiding microstructure layer 112 and in contact with the base layer 112b. In some embodiments, the light-transmitting layer 114 is in contact with an upper surface and a side surface of the base layer 112b. In some embodiments, the light-transmitting layer 114 is not in contact with the lower surface of the base layer 112b. In some embodiments, the light-transmitting layer 114 is not in contact with the microstructures 112m.

In some embodiments, the light-transmitting layer 114 has an opening 114a extending inward (extending upward) from a lower surface of the light-transmitting layer 114, and the base layer 112b is disposed in the opening 114a. In some embodiments, the opening 114a is a blind hole. In some embodiments, the lower surface of the light-transmitting layer 114 outside the opening 114a is substantially coplanar with the lower surface of the base layer 112b, so the keycap 110 is still very thin.

The light-transmitting layer 114 is made of a second material different from the first material. In some embodiments, the second material includes a light diffusing agent (e.g., light diffusing powder, such as titanium dioxide powder), so that the light-transmitting layer 114 has a haze effect, which helps the light exiting surface of the light-transmitting layer 114 to be fully uniformly illuminated. In some embodiments, the second material includes the light diffusing agent and a light-transmitting plastic material (e.g., polymethyl methacrylate (PMMA), polycarbonate (PC), or other suitable materials). In other embodiments, the second material does not include the light diffusing agent.

It is worth noting that, since the light-guiding microstructure layer 112 and the light-transmitting layer 114 are made of different materials, and the color, light transmittance and/or texture of the light-transmitting layer 114 may be changed, the disclosed keycap 110 can satisfy various needs for the color, light transmittance, and appearance.

On the other hand, as shown in FIG. 2, the arrangement position of the light-guiding microstructure layer 112 can avoid the positions where the light transmitting layer 114 to be provided with protruding structures (e.g., four sliding grooves (not marked) arranged at periphery and a pre-pressed structure (not marked) arranged at central), and the distribution area of the light-guiding microstructure layer 112 and the distribution density and height of the microstructures 112m can be adjusted, so that the light-guiding microstructure layer 112 has a better light guiding effect.

In some embodiments, as shown in FIG. 1, the keycap 110 further includes a primer layer 116 and a topcoat layer 118. The primer layer 116 is disposed on and covers the light-transmitting layer 114. The topcoat layer 118 is disposed on and covers the primer layer 116. A color of the topcoat layer 118 is different from a color of the primer layer 116. In some embodiments, each of the primer layer 116 and the topcoat layer 118 include a paint. In some embodiments, each of the primer layer 116 and the topcoat layer 118 is made of a material including a paint, a curing agent, and other suitable additives (e.g., a thinner). In some embodiments, the paint includes acrylic, rubber, polyurethane, other suitable materials, or a combination thereof. The topcoat layer 118 has one or more through openings 118a exposing one or more portions of the primer layer 116 for displaying character(s). In some embodiments, the through openings 118a are formed by a laser engraving process or other suitable processes. In some embodiments, the keycap 110 further includes a wear-resistant layer (not shown) disposed on and covering the topcoat layer 118.

As shown in FIG. 1, the present disclosure further provides a key structure, which includes the above-mentioned keycap 110, a circuit board 120 and at least one light source 130. The circuit board 120 is disposed beneath the keycap 110. In some embodiments, the circuit board 120 and the light source 130 constitute a printed circuit board assembly (PCBA). The light source 130 is disposed over the circuit board 120 and is disposed between the circuit board 120 and the keycap 110. The light source 130 is configured to provide light projected to the light-guiding microstructure layer 112. In some embodiments, the light source 130 is a light emitting diode, but the present disclosure is not limited thereto.

In some embodiments, the key structure further includes a base plate 140, a membrane circuit board 150 and a connecting element 160. In some embodiments, the connecting element 160 is connected between the keycap 110 and the circuit board 120. In some embodiments, the connecting element 160 is connected between the keycap 110 and the base plate 140. In some embodiments, the key structure employs a mechanical switch (e.g., cherry switch). In other embodiments, the connecting element may be a scissor-type connecting element or another suitable connecting element. In some embodiments, the base plate 140 and the circuit board 120 are bonded through an adhesive layer (not shown).

It is worth noting that, since the light of the light source 130 is projected onto the light-guiding microstructure layer 112 and then uniformly guided to the light-transmitting layer 114, the light exiting surface of the light-transmitting layer 114 can be fully uniformly illuminated, and thus the illumination of the full character(s) can be realized. It can be seen that the illumination of the keycap 110 of the present disclosure is not limited by the shading of the various elements (e.g., the connecting element) beneath the keycap 110 and the emission angle of the light source 130.

The present invention further provides a method for manufacturing a keycap, which includes sequentially performing a first injection molding process and a second injection molding process to form a light-transmitting layer 114 and a light-guiding microstructure layer 112, respectively, or sequentially performing a first injection molding process and a second injection molding process to form a light-guiding microstructure layer 112 and a light-transmitting layer 114, respectively. That is to say, the light-transmitting layer 114 (or the light-guiding microstructure layer 112) can be formed by performing the first injection molding process using a material tube containing the second material (or the first material) and its corresponding male and female molds, and the light-guiding microstructure layer 112 (or the light-transmitting layer 114) can then be formed by performing the second injection molding process using a material tube containing the first material (or the second material) and its corresponding male and female molds. In some embodiments, after the light-transmitting layer 114 (or the light-guiding microstructure layer 112) is formed, it is cooled and shaped, and it is then rotated to an appropriate position by a turntable, and a second injection molding process is then performed to form the light-guiding microstructure layer 112 (or light-transmitting layer 114).

However, the above are only the preferred embodiments of the present disclosure, and should not be used to limit the scope of implementation of the present disclosure, that is, simple equivalent changes and modifications made in accordance with claims and description of the present disclosure are still within the scope of the present disclosure. In addition, any embodiment of the present disclosure or claim does not need to achieve all the objectives or advantages disclosed in the present disclosure. In addition, the abstract and the title are not used to limit the scope of claims of the present disclosure.

What is claimed is:

1. A keycap, comprising:
    a light-guiding microstructure layer made of a first material, the light-guiding microstructure layer comprising a base layer and a plurality of microstructures disposed on a lower surface of the base layer;
    a light-transmitting layer disposed on the light-guiding microstructure layer and in contact with the base layer, the light-transmitting layer being made of a second material different from the first material; and
    a topcoat layer, disposed over and covering the light-transmitting layer, wherein the topcoat layer has a least one through opening, and vertical projection of the light-guiding microstructure layer is greater than a vertical projection of the at least one through opening, and the vertical projection of the light-guiding microstructure layer is at least partially overlapped with the vertical projection of the at least one through opening.

2. The keycap of claim 1, wherein the light-transmitting layer is not in contact with the microstructures.

3. The keycap of claim 1, wherein the light-transmitting layer has an opening extending inward from a lower surface of the light-transmitting layer, and the base layer is disposed in the opening.

4. The keycap of claim 3, wherein the opening is a blind hole.

5. The keycap of claim 3, wherein the lower surface of the light-transmitting layer outside the opening is substantially coplanar with the lower surface of the base layer.

6. The keycap of claim 1, wherein the second material comprises a light diffusing agent.

7. The keycap of claim 1, further comprising:
    a primer layer, disposed between the light-transmitting layer and the topcoat layer,
    wherein a color of the topcoat layer is different from a color of the primer layer, and the at least one through opening of the topcoat layer exposes a portion of the primer layer.

8. A key structure, comprising:
    the keycap of claim 1;
    a circuit board, disposed beneath the keycap; and
    at least one light source, disposed over the circuit board and between the circuit board and the keycap, and the light source being configured to provide light projected to the light-guiding microstructure layer.

9. A method of manufacturing a keycap, comprising:
    sequentially performing a first injection molding process and a second injection molding process to form a light-transmitting layer and a light-guiding microstructure layer, respectively, or to form a light-guiding microstructure layer and a light-transmitting layer, respectively, wherein the light-guiding microstructure layer comprises a base layer and a plurality of microstructures disposed on a lower surface of the base layer, and the light-transmitting layer is disposed on the light-guiding microstructure layer and in contact with the base layer; and
    forming a topcoat layer over and covering the light-transmitting layer, wherein the topcoat layer has at least one through opening, and a vertical projection of the light-guiding microstructure layer is greater than a vertical projection of the at least one through opening, and the vertical projection of the light-guiding microstructure layer is at least partially overlapped with the vertical projection of the at least one through opening.

10. The method of claim 9, wherein the light-guiding microstructure layer is made of a first material, and the light-transmitting layer is made of a second material different from the first material.

* * * * *